May 31, 1932. J. D. BALDWIN, JR 1,860,605
METHOD OF PRODUCING TUBE FITTINGS FOR HYDRAULIC BRAKE SYSTEMS
Filed May 16, 1929 2 Sheets-Sheet 1
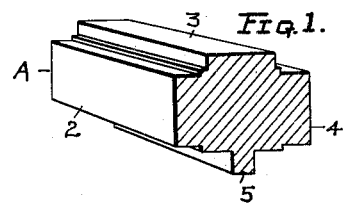
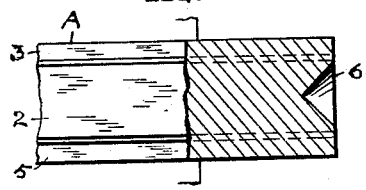
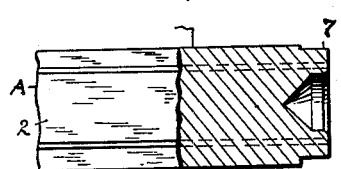
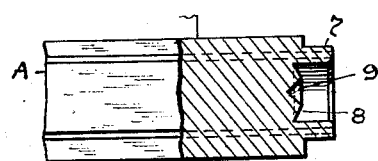
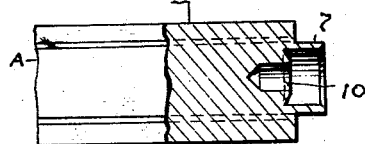
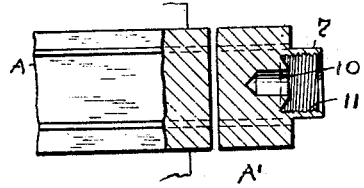
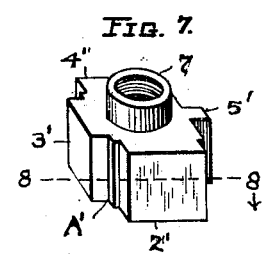
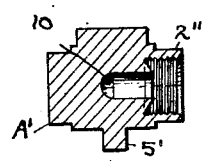
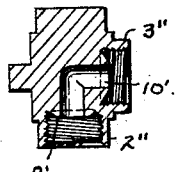
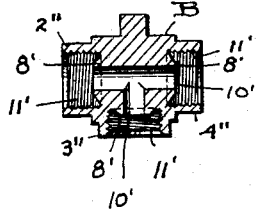
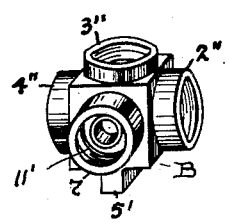
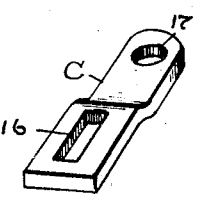
INVENTOR
J. D. Baldwin Jr.
ATTORNEYS May 31, 1932.  J. D. BALDWIN, JR  1,860,605
METHOD OF PRODUCING TUBE FITTINGS FOR HYDRAULIC BRAKE SYSTEMS
Filed May 16, 1929  2 Sheets-Sheet 2
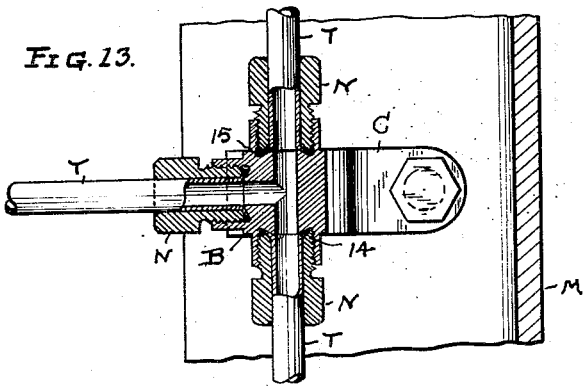
FIG.13.
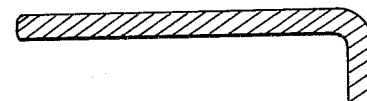
FIG.14.
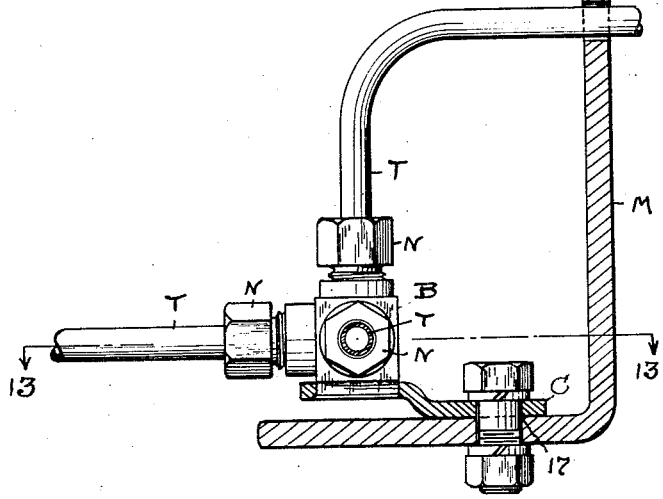
INVENTOR
J. D. Baldwin Jr.
BY
ATTORNEYS Patented May 31, 1932

1,860,605

UNITED STATES PATENT OFFICE

JOHN D. BALDWIN, JR., OF CLEVELAND, OHIO, ASSIGNOR TO ALBERT J. WEATHERHEAD, JR., OF CLEVELAND, OHIO

METHOD OF PRODUCING TUBE FITTINGS FOR HYDRAULIC BRAKE SYSTEMS

Application filed May 16, 1929. Serial No. 363,678.

This invention pertains to improvements in a method of making tube fittings for hydraulic brake systems for automobiles. Customarily the hydraulic tubes used in such systems consist of small copper tubes which are connected to each other and to various hydraulic braking and controlling devices by metal fittings which are made of either cast or forged stock. My object in general is to produce smaller and more satisfactory fittings for the same purpose but more expeditiously and at a considerable reduction in cost by using extruded material of predetermined shape and practicing the steps hereinafter described in or with automatic metal working machines. The fittings are particularly constructed to connect such hydraulic tubes to each other and/or to various hydraulic controlling and pressure devices, and also to connect the fitting itself to a chassis frame, axle housing, or other fixed part of an automobile, all as herein shown and described in detail and more concisely set forth in the claims.

The several figures of the accompanying drawings depict one embodiment of the invention in different stages of development and as completed and used. Thus, Fig. 1 is a cross section and perspective view of an extruded bar of brass of special shape adapted to produce the body of a tube fitting of a particular form and type, and Fig. 2 is a side elevation, partly in section of the same rod as it appears in the first operation.

Figs. 3 to 6, inclusive, are side elevations and sectional views of the same rod and piece of work at successive stages of operations until the portion being operated on is severed from the rod. Fig. 7 is a perspective view of the severed piece placed upright or in a perpendicular position for further operations, in an automatic metal working machine. Figs. 8 to 10, inclusive, are sectional views of the severed piece taken on line 8—8 of Fig. 7, showing the same as it appears in other successive stages of operations. Fig. 11 is a perspective view of the finished piece, minus its supporting arm, and Fig. 12 is a perspective view of the said supporting arm. Fig. 13 is a horizontal section (on line 13—13 of Fig. 14) of a complete fitting attached to a chassis frame and connected to several hydraulic tubes, as in use. Fig. 14 is a side view of the same fitting and its connected tubes, the supporting arm of the fitting and the chassis frame being in section.

In producing the tube fitting delineated in the drawings, a solid bar or rod A of brass is first provided, see Fig. 1. This rod is extruded, rolled or otherwise formed in a predetermined shape in cross section to facilitate the production of a tube fitting with a minimum waste and expense, and in the present instance the cross sectional shape of rod A is particularly conducive to the rapid production of a four-way tube fitting B having an attachment arm or supporting extension C, see Figs. 13 and 14. Thus, referring to Fig. 1, bar A is substantially rectangular in cross section and ribbed or corrugated longitudinally on four sides thereof, having three relatively wide flat ribs or protruding areas 2, 3, and 4, respectively on three sides, and a relatively narrow rib 5 projecting centrally from its fourth side. In producing tube fittings from this rod the rod is severed transversely into separate pieces of the same length, and the three wide ribs 2, 3, and 4, provide three square angularly-related extensions 2', 3', and 4' in each severed piece, and the narrow rib 5 provides a short tongue 5' on the same piece, see Fig. 7. The square angular extensions referred to are machined, bored and tapped to provide female coupling extensions for a corresponding number of flanged tubes, and a fourth female coupling extension for a flanged tube may be produced on the main axis of the rod by practicing the steps herein described.

Thus, taking an extruded rod of any desired length, such as ribbed rod A, it may be fed through the rotatable collet of an automatic screw machine and operated upon by a series of cutting and tapping tools, as follows:

First, the end of the rod is formed with a centering cavity 6, see Fig. 2; then the extremity of the rod may be machined or turned round or circular for a short distance to provide a cylindrical extension 7 and also bored axially for a short distance, see Fig. 3. Next, the depth of the axial bore is increased and a conical bottom 8 and centering cavity 9 produced therein, see Fig. 4. Cylindrical extension 7 may also be machined to a smaller diameter during such proceedings and the next, which involves the boring of a smaller opening 10 axially through the cone to a predetermined depth, say substantially as delineated in Fig. 5. The next step involves the use of tapping and cutting tools to produce internal screw-threads 11 the full depth of the cavity surrounding the cone and to sever rod A transversely at a predetermined distance beyond the inner end of the central bore or opening 10, for example, as depicted in Fig. 6. The severed piece A' is shown in perspective in Fig. 7, and in addition to having the three square projecting portions 2', 3', and 4', hereinbefore described it also includes one bored and tapped cylindrical extension 7 on the main axis at one end thereof. The production of such pieces is rapidly accomplished and successively repeated until the rod is consumed, using an automatic screw machine for that purpose.

The severed and partly finished pieces A' are then introduced into a second automatic metal working machine, and the three angular projections or extensions 2', 3', and 4' operated upon successively in exactly the same way as pictured in Figs. 2 to 6, inclusive, except for the severing operations. That is, each square extension of the severed piece is presented to and operated upon by a series of cutting and tapping tools to provide a round cylindrical boss or extension 2", 3" and 4", as shown in Fig. 11, each containing a screw-threaded cavity 11' as shown in Fig. 10, having a cone 8' at its bottom and an axial bore or opening 10' through the cone. The openings 10' intersect and communicate with each other, including opening 10 within the base of extension 7; therefore, this single fitting permits four separate hydraulic tubes T to be secured thereto, see Figs. 13 and 14. Coupling of the tubes to the fitting is effected by tubular nuts N sleeved over the tubes and having flaring extremities 14 adapted to clamp the flanged ends 15 of the tubes in fluid-tight engagement with the conical seats within the fitting, see Fig. 13.

Now returning to the fitting marked B in Fig. 11, note that the short flat tongue 5' extending centrally from one side thereof is provided to support the fitting in a stationary position on a fixed part of the vehicle, for example, the flanged side member M of the chassis frame of an automobile, using a flat bar or piece C of metal having a slot 16 therein to receive tongue 5' which is long enough to be upset or peened over to secure the fitting and the supporting member C rigidly together. Preferably, member C is bent or offset at one end and formed with an opening 17 to permit this part to be bolted, screwed or riveted to member M or other support, with the fitting raised or spaced apart from the walls, substantially as shown in Fig. 14.

What I claim, is:

1. A method of producing a tube fitting substantially as herein described, consisting in forming a screw-threaded cavity axially in rotating extruded rod stock, in severing short sections including said cavities from said stock and forming screw-threaded cavities and conical seats and fluid passages within the sides of said sections.

2. A method of producing a tube fitting consisting in forming a fluid passage axially within one end of a solid bar and screw-threaded cavities within the sides of said bar at right angles to the axis thereof, including conical seats at the base of said cavities and fluid passages therein intersecting said axial fluid passage.

3. A method of producing a tube fitting consisting in forming a screw-threaded cavity and an axial fluid passage within one end of a flat sided bar, in severing the part so formed from the bar, and subsequently forming screw-threaded cavities within the flat sides of said part and also conical bottoms and fluid passages through said bottoms in communication with said axial fluid passage.

4. A method of producing tube fittings, consisting in producing a screw-threaded cavity and longitudinal bore in one end of a section of a flat-sided rod or bar, forming a cross bore in intersection with said longitudinal bore, and screw-threaded cavities and conical seats in the flat sides of said section at opposite ends of said cross bore, and shaping said section at one side for attachment to a supporting part.

5. A method of producing tube fittings, consisting in producing a screw-threaded cavity, and a smaller bore in one end of a flat-sided rod or bar, severing the treated portion from the main body of the bar, forming an intersecting cross bore in the severed piece and a conical seat and screw-threaded cavity in one flat side thereof axially with the cross bore, and shaping another side of said bar to facilitate the mounting thereof upon another part.

6. A method of producing tube fittings, consisting in producing a multiple number of screw-threaded cavities and fluid passages within two sides of a short section of a flattened rod and shaping another side of said section for attachment to a supporting member.

In testimony whereof I hereby affix my signature.

JOHN D. BALDWIN, Jr.